United States Patent [19]

Zenner

[11] Patent Number: 5,894,512
[45] Date of Patent: Apr. 13, 1999

[54] METHOD AND APPARATUS FOR ROUTING VOICE AND VIDEO CALLS TO A GROUP OF AGENTS

[75] Inventor: Hal B. Zenner, Fair Haven, N.J.

[73] Assignee: NCR Corporation, Dayton, Ohio

[21] Appl. No.: 08/686,857

[22] Filed: Jul. 26, 1996

[51] Int. Cl.[6] .......................... H04Q 3/64; H04M 3/00; H04N 7/14; H04J 3/12

[52] U.S. Cl. .......................... 379/265; 348/14; 348/16; 370/270; 370/524; 379/309

[58] Field of Search .......................... 348/14, 16, 17; 370/524, 270; 379/207, 265, 266, 309, 214, 127

[56] References Cited

U.S. PATENT DOCUMENTS

| | | | |
|---|---|---|---|
| 4,645,872 | 2/1987 | Pressman et al. | 379/202 X |
| 5,164,982 | 11/1992 | Davis | 379/93.17 |
| 5,400,068 | 3/1995 | Ishida et al. | 348/14 |
| 5,432,848 | 7/1995 | Norio | 379/266 |
| 5,444,477 | 8/1995 | Yamadera et al. | 348/15 |
| 5,469,504 | 11/1995 | Blaha | 379/265 |
| 5,473,680 | 12/1995 | Porter | 379/201 |
| 5,479,487 | 12/1995 | Hammond | 379/88.22 |
| 5,563,937 | 10/1996 | Bruno et al. | 379/266 X |

Primary Examiner—Harry S. Hong
Attorney, Agent, or Firm—Ying Tuo

[57] ABSTRACT

A call center, including a PBX/ACD and a CTI server, is provided to route both voice and video calls to a single group of agents. A modem call from an end-point terminal is used to initiate and prepare a video call. Upon receiving an inbound voice or a modem call, the PBX/ACD passes ANI and DNIS to the CTI server. In response to the inbound voice or video call, the CTI server selects a group of agents capable of handling the inbound call, and sends routing information to the PBX/ACD so that the ACD can route the inbound call to the selected group of agents. Before an inbound call is routed to an agent, the CTI server generates a flag to indicate the nature of the inbound call. If the flag indicates a video call initiated by a modem call, a modem at the agent's side will respond to the modem call from the end-point terminal, and a separate ISDN call is then made to establish a video connection. If the flag indicates a voice call, a telephone set at the agent's side will simply ring.

24 Claims, 6 Drawing Sheets

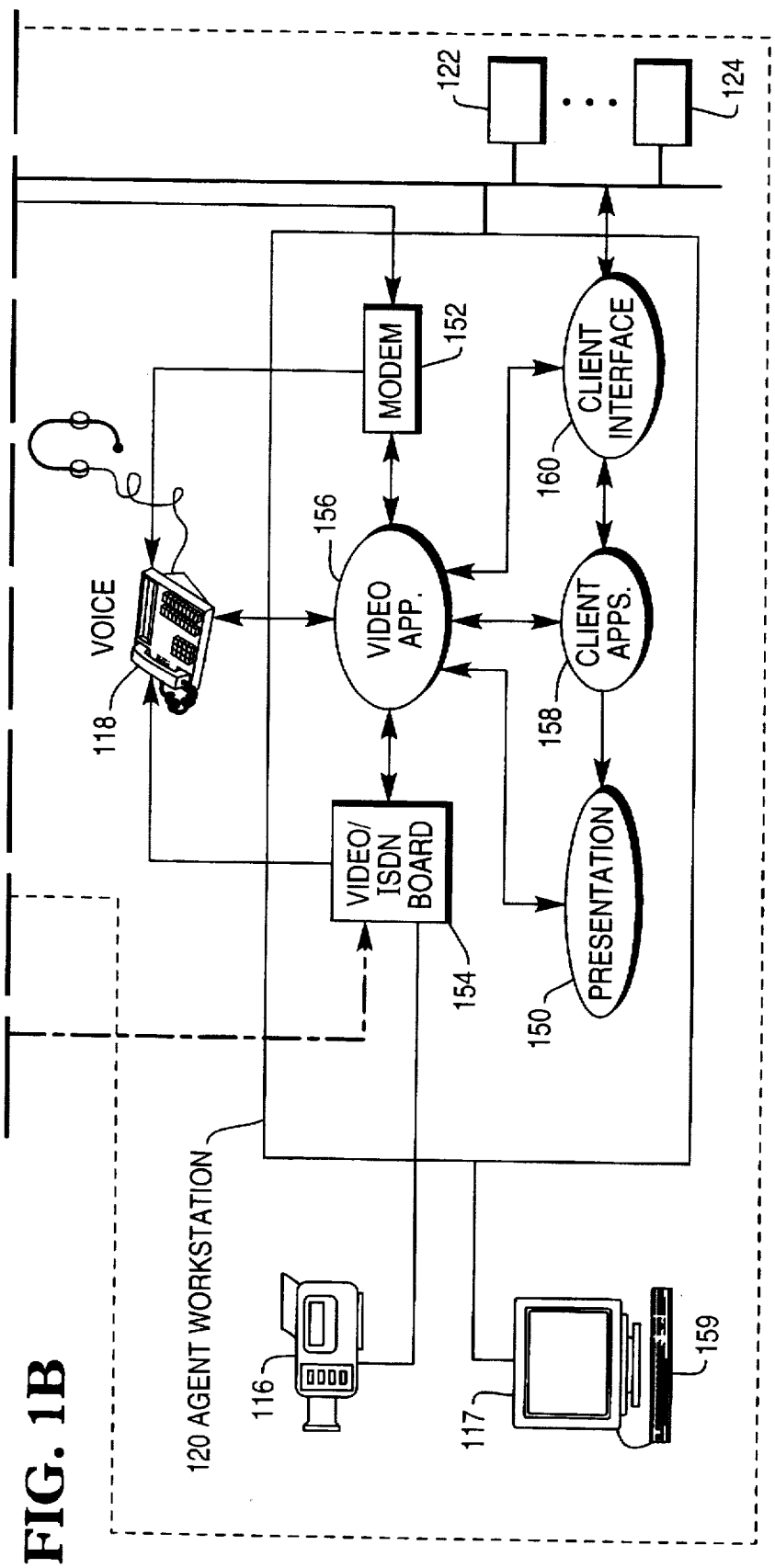

1

METHOD AND APPARATUS FOR ROUTING VOICE AND VIDEO CALLS TO A GROUP OF AGENTS

BACKGROUND OF THE INVENTION

The present invention generally relates to a method and apparatus for routing inbound voice and video calls to agents in a call center environment.

It is known that a Private Branch Exchange (PBX) or an Automatic Call Distributor (ACD) can route inbound voice calls from consumers to the agents in a call center environment.

To improve efficiency, it is sometimes advantageous to divide all the agents in a call center into several groups. A group of agents, also known as a split, is defined as one or more agents doing similar work or having common skills or attributes. An administrative procedure is initiated to configure groups' (or splits') definitions, so that the PBX/ACD can manage the groups (or splits) based on the definitions. Agents with a common work or skill or attribute set usually log into a split (or a group), before they are ready to take calls. When an inbound call centers the PBS/ACD, it can be routed to a group of agents (or an agent) based on characteristics, such as: the telephone number dialed by a customer, the customer's telephone number identification, the time of the day called, etc.

While conventional call centers can route either voice or video calls, they are unable to route both voice and video calls to a same group of agents. Under such a limitation, a conventional call center capable of processing both voice and video calls has to divide its agents into at least two groups, one handling voice calls and the other handling video calls. This arrangement can be wasteful of human resources and facilities in a call center. For example, an inbound voice call has to wait for service if all the agents in the voice groups are busy, even when some agents in the video group are available. By the same token, an inbound video call has to wait for service if all the agents in the video group are busy, even when some agents in the voice group are available.

Thus, to efficiently use the agents and facilities available in a call center to handle inbound calls, there exists a need to provide improved apparatus and method that are capable of routing both voice and video calls to the agents in a single group.

Furthermore, to enhance compatibility with existing call center technology, and reduce the cost to upgrade existing call centers, there exists another need to provide improved apparatus and method that are capable of routing both voice and video calls to the agents in a single group without imposing undue modification on the existing call center technology.

The present invention provides improved apparatus and method to meet these needs.

SUMMARY OF THE INVENTION

In one aspect, this invention provides an apparatus for routing first type calls and second type calls from one or more end-point terminals to a service group in a call center. The service group includes one or more service terminals capable of processing the first type and second type calls. The apparatus comprises:

means for receiving said first type calls;
means for receiving said second type calls; and
means for routing said received first type and second type calls to said service group.

In another aspect, this invention provides a method for routing first type calls and second type calls from one or more end-point terminals to a service group in a call center. The service group includes one or more service terminals capable of processing the first type and second type calls. The method comprises the steps of:

receiving said first type calls;
receiving said second type calls; and
routing said received first type and second type calls to said service group.

The above and other features and advantages of the present invention will become apparent from the following description and attached drawings.

DETAILED DESCRIPTION OF THE PREFERRED EMBODIMENT

Figure 1A:
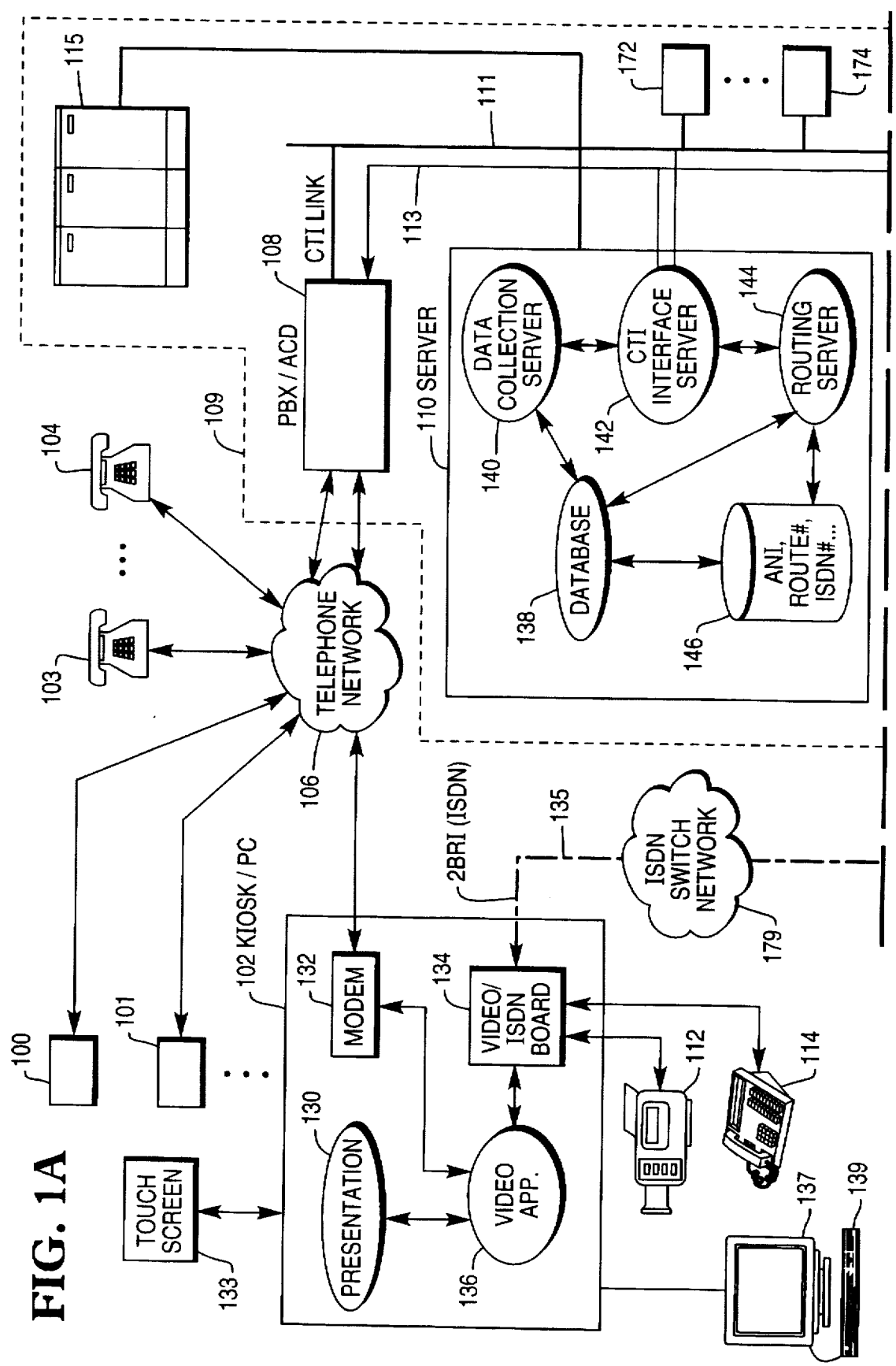
FIGS. 1–1B depict a system for routing voice and video calls to the agents in a call center, in accordance to the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

FIG. 1 (including 1A and 1B) depicts a system for routing voice and video calls to the agents in a call center, in accordance of the present invention.

As shown in FIG. 1, the system includes a plurality of end-point terminals (100, 101, 102) with each having a video camera and a telephone set attached to it, a plurality of user telephone sets (103, 104), a telephone network 106, and a call center 109 (delineated within the dotted line).

An end-point terminal can be a PC (Personal Computer) capable of processing voice and video calls, or it can be a kiosk. Kiosk is a term commonly used in the call center environment to refer a video-enabled user end-point. A kiosk may have a video display and various input media, such as touch-screens, video cameras, scanners, keyboards, etc. A video kiosk may also require a device to send and receive a voice call, such as a telephone set. Coupled to end-point terminal 102 are video camera 112, telephone set 114 (with speaker phone feature), a display device 113, and a touch screen 133.

Described as representative of the plurality of end-point of terminals, end-point terminal 102 includes a presentation layer 130, a modem 132, a video/ISDN board 134, and a video application 136.

Presentation layer 130 provides an interface between a user and various internal applications, such as instructions, image of an agent during a video call, and information presented to the user. Additionally, it allows the caller to control touch-screens, cameras, scanners, keyboards, etc.

Usually, an end-point terminal or kiosk is equipped with a presentation layer.

Modern 132 is able to initiate a modem call to, or respond to a modem call from, call center 109. It can also send data to, or receive data from, the call center.

Video/ISDN board 134 is able to initiate and respond to an ISDN video connection between end-point terminal 102 and an agent workstation (120, 122, 124, 172, 174 in call center 109) during a video call. It can also send integrated voice/video data to, or receive integrated voice/video data from, an agent workstation.

Video application 136 is able to control video/ISDN board 134 in end-point terminal 102 to generate a video call to, or receive a video call from, call center 109. It is also able to process integrated voice/video data to be sent to or received from an agent work station (120, 122, 124, 172, or 174) in call center 109.

Each of the plurality of telephone sets (103, or 104) is able to initiate a voice call to, or receive a voice call from, call center 109.

As shown in FIG. 1, call center 109 includes PBX/ACD, a Computer-Telephone Integration (CTI) server 110, a data warehouse 115, and plurality of agent workstations (120, 122, 124, 172, 174). PBX/ACD 108 is connected to CTI server 110 via CTI link 111, and each of the agent workstations are connected to CTI server 110 via a TCP/IP LAN (local area network) interface (now shown).

CTI interface server 110 includes a database 138, data collection server 140, a CTI interface server 142, and a routing server 144.

Database 138 is a centralized repository of data that contains (or has access to) information about prospective callers' profiles and information passed over a modem link to an agent workstation from an end-point terminal. Specifically, database 138 contains (or has access to) caller's ANIs that are recognizable by call center 109, routing numbers to agents, and ISDN numbers of kiosks and end-point terminals. Database 138 also contains (or has access to) the information relating to the ANIs and DNISSs. (ANI stands for Automatic Number ID, and DNIS stands for Dialed Number Identification Service).

CTI interface server 142 is a server application capable of monitoring and controlling resources on PBX/ACD 108, on behalf of other server applications, user applications, or agent applications.

Routing server 144 is a server application capable of accepting ANI and DNIS information that is passed by PBX/ACD 108 via CTI link 111 to CTI interface server 142, and mapping this information to a split (or group) identifier. Routing server 144 contains (or has the access to) the information relating all the splits (groups) in call center 109. In addition, routing server 144 contains (or has the access to) the information relating all DNISSs in call center 109 and all ANIs that are recognizable by call center 109. For example, an ANI may indicate whether a caller is a voice call consumer or a video call consumer; a DNIS may indicate whether a requested service (identified by a DNIS) is a call service or a video call service.

Described as a representative of the plurality of the agent workstations, agent workstation 120 includes video/ISDN board 154, video application 156, modem 152, presentation layer 150, client applications 158, and client interface 160. Connected with agent workstation 120 is a video camera 116, a display device 117, and a telephone set 118.

In FIG. 1, presentation layer 150 is a user interface that allows an agent to interact with voice and video capability services.

Modem 152 is able to respond to a modem call from an end-point terminal. It can also send data to, and receive data from, an end-point terminal.

Video/ISDN board 154 is able to initiate an ISDN video connection to a video/ISDN board 134 in an end-point terminal. It can also send integrated voice and video data to, and receive integrated voice and video data from, an end-point terminal.

Video application 156 is able to control video/ISDN board 154.

Client applications 158 are able to perform agent services for different customer applications.

Client interface application 160 is able to communicate with CTI server 110 via the TCP/IP LAN interface (not shown).

Figure 2C:
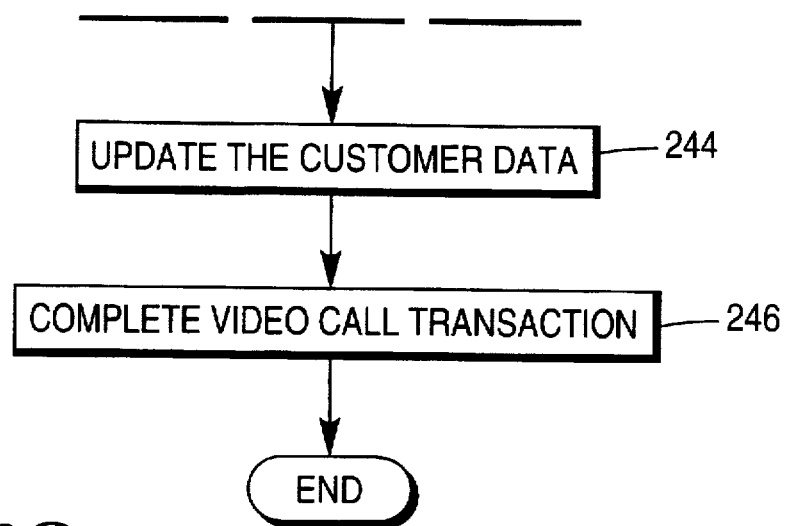
FIGS. 2–2C depict a flowchart showing a process of routing a call to an agent workstation in the call center, in accordance to the present invention.
Figure 2:
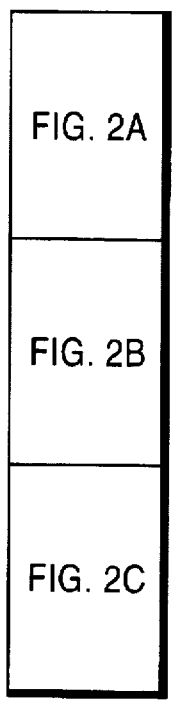
Figure 2A:
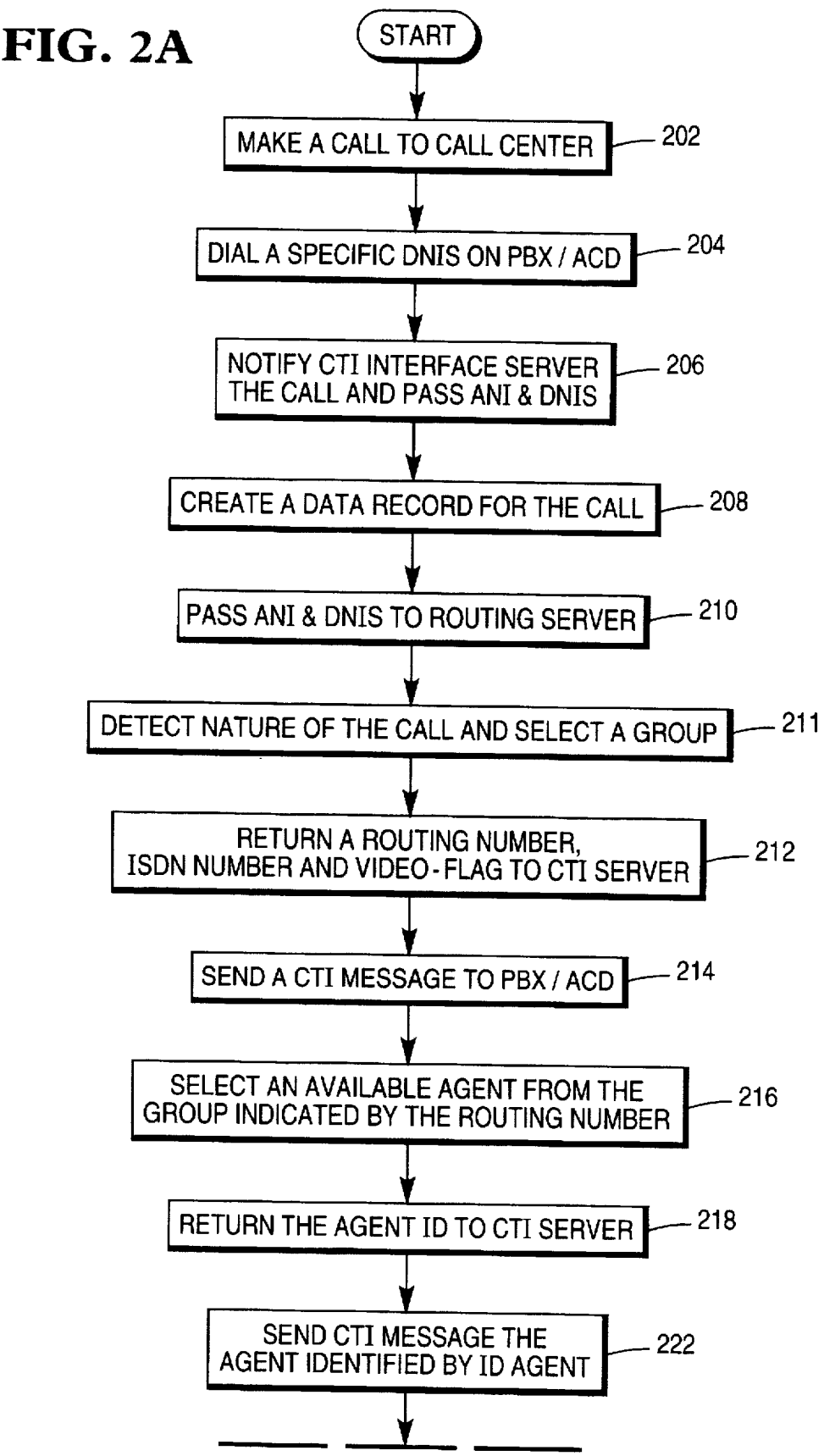
Figure 2B:
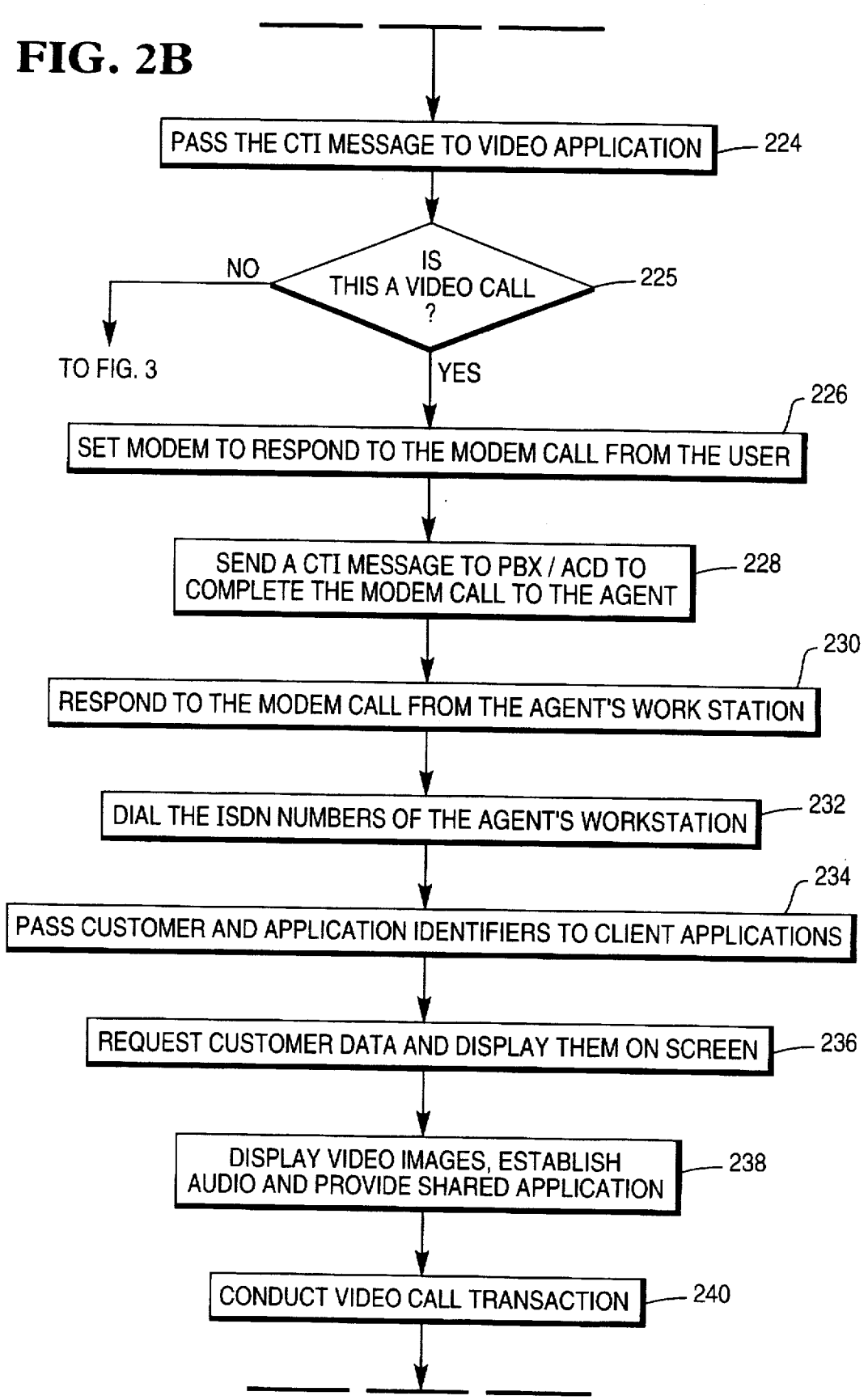

FIG. 2 (including 2A, 2B and 2C) depicts a flowchart showing a process of routing a call (either a video call or a voice call) to an agent workstation, in accordance with the present invention. In the routing process shown FIG. 2, it is assumed that agent workstations 120, 122, 124 are assigned into a single group. However, it should be noted that it is possible that a group may contain only one agent workstation.

In step 202, a customer uses end-point terminal 102 (via either touch screen 137 or keyboard 139) or telephone set 103 to make a call to call center 109.

If the call is made using end-point terminal 102, the customer interacts with presentation layer 130 to generate a modem call request.

In step 204, a specific DNIS on PBX/ACD 108 is dialed.

In step 204, if the call is made using end-point terminal 102, the customer interacts with an application (mortgage application for example) via presentation layer 130 to generate a modem call request. In response to the modem call request from the presentation layer 130, video application 136 dials, via a modem call using modem 132, a specific DNIS on PBX/ACD 108. Video application 136 selects a specific DNIS based on the nature of the application.

In step 204, if the call is made using telephone set 103, a specific DNIS on PBX/ACD is directly dialed by the user.

In either case, the call will be switched to PBX/ACD 108 via telephone network 106, and an ANI is attached with the call to PBX/ACD).

In step 206, upon receiving the inbound call, PBX/ACD 108 notifies CTI interface server 142 via CTI link 111 that a call has arrived and passes the DNIS and ANI to the CTI interface server.

In step 208, CTI interface server 142 requests data collection server 140 to create a data record for this arrived call. Data collection server 140 collects call/data information and saves the information in database 138.

In step 210, CTI interface server 142 passes the ANI and DNIS to routing server 144.

In step 211, routing server 144 needs to detect whether the call is a video call or a voice call by searching the routing information (which is located with routing server 144, database 138 or disk driver 146). Based on the routing information relating to either the DNIS, the ANI, or combination of the DNIS and ANI, routing server 144 can identify whether the call is a video or a voice call. Then, routing server 144 selects the best group of agents to handle the inbound call based on the DNIS, the ANI, or combination of the DNIS and ANI. The selected group is identified by a routing number called group_id (or split_id).

In step 212, routing server 144 returns CTI interface server 142 with the control data including:

(1) a routing number (split_id), which is associated with a group of voice or video enabled agent workstations (such as agent workstations 120, 122, 124) that are able to handle the application (shown in step 202);

(2) ISDN (integrated services digital network) numbers associated with 2 BRI channels 135 between the video-enabled agent workstations and the received ANI, if routing server 144 detects that the inbound call is a video call; and (3) a video_flag (which is in an active state if the inbound call is a video call and in an inactive state if the inbound call is not a video call).

ISDN numbers are the telephone numbers for ISDN service. A video call using ISDN requires H.320 protocol via multiple (2, 4, or 6) BRI (Basic Rate Interface) channels. (BRI is defined in ISDN specification). In the embodiment shown FIG. 2, stored in disk driver 146 include all video kiosk ANIs that are allowed to access the call center, all ISDN numbers that have been assigned to video capable end-point terminals, and all routing numbers that identify groups (splits) in the call center. Each of these video kiosk ANIs is keyed (mapped) to one or more of the ISDN numbers associated with BRI channels, so that routing server 144 can select ISDN numbers based on the ANI received from the modem call.

In step 214, CTI interface server 142 sends a CTI routing message containing a split_id (or group_id) to PBX/ACD 108.

In step 216, PBX/ACD 108 selects an available agent from the pool of agents logged into the split_id. The selected agent is identified by an agent_id.

In step 218, PBX/ACD 108 returns agent_id to CTI interface server 142. In this example, it is assumed that the agent_id identifies agent workstation 120.

In step 222, CTI interface server 142 sends a CTI message to the agent workstation identified by the agent_id. If the inbound call is a video call, the message contains ISDN numbers associated with the ANI and active video_flag. If the inbound call is a voice call, the message contains the ANI, and inactive video_flag.

In step 224, client interface application 160 receives the CTI message and passes it to video application 156.

In step 225, video application 156 detects whether the inbound call is a voice or a video call by checking the state of the video_flag. If the video_flag is in an inactive state, the operation is directed to step 326 in FIG. 3. If the video_flag is in an active state, the operation is directed to step 226 immediately below.

In step 226, because the video_flag is in active state, video application 156 sets modem 152 to answer the modem call generated by end-point terminal 102. Also, video application 156 sends acknowledgment to CTI interface server 142 (via client interface application 160) that modem 152 has been set.

In step 228, upon receiving the acknowledgment from video application 156, CTI interface server 142 sends a CTI message to PBX/ACD 108, so that the PBX/ACD can route the modem call to the identified agent workstation (agent workstation 120 in this example). At this step, a modem link is established between end-point terminal 102 and agent workstation 120, so that control data, such as customer identification (cust_id), application identification (app_id), and video kiosk identification (kiosk_id), can be passed from end-point terminal 102 to CTI interface server 142 and modem 152.

A kiosk_id can be used to provide security measure for call center 109. More specifically, database 138 in call center 109 contains a security database, where each of the "legitimate" kiosks corresponds to a unique kiosk_ANI. Upon receiving a kiosk_id, CTI interface server 142 searches a match between the kiosk_id and a kiosk_ANI in the security database. If there is a match, access to call center 109 will be granted; otherwise the access to call center 109 will be denied.

In step 230, video application 156 responds to the modem call generated by end-point terminal 102, to establish a data session so that the control data can be passed from end-point terminal 102 to video application 156.

In step 232, video application 156 instructs video/ISDN board 154 to dial the ISDN numbers contained in the CTI message. Upon the completion of the dialing, a video/audio/data link is established using 2 BRI channels 135 between end-point terminal 102 and agent workstation 120. Video application 156 can provide status information to the agent, via presentation layer 150, who is operating the agent workstation 120, that a video call connection is being established.

In step 234, video application 156 passes the application identifier (app_id) and customer identifier (cust_id) to client applications 158. Among client applications 158, a customer specific video transaction application is invoked according to the app_id.

In step 236, the customer specific video transaction application requests the customer data based on the cust_id via client interface application 160. The data relating to the calling customer can be generated from database 138 and presented to the agent via presentation layer 150.

In step 238, the customer specific video transaction application displays the customer data on display device 117 in agent workstation 120. Also video applications 134 (in the end-point terminal) and 156 (in the agent workstation) displays video images, establish audio, and provide shared application to end-point terminal 102 agent workstation 120, respectively.

In step 240, the video call transaction is conducted between the caller and the agent.

In step 244, the customer data newly collected can be saved to update the caller's data record.

In step 246, the video call transaction is completed.

Figure 3:
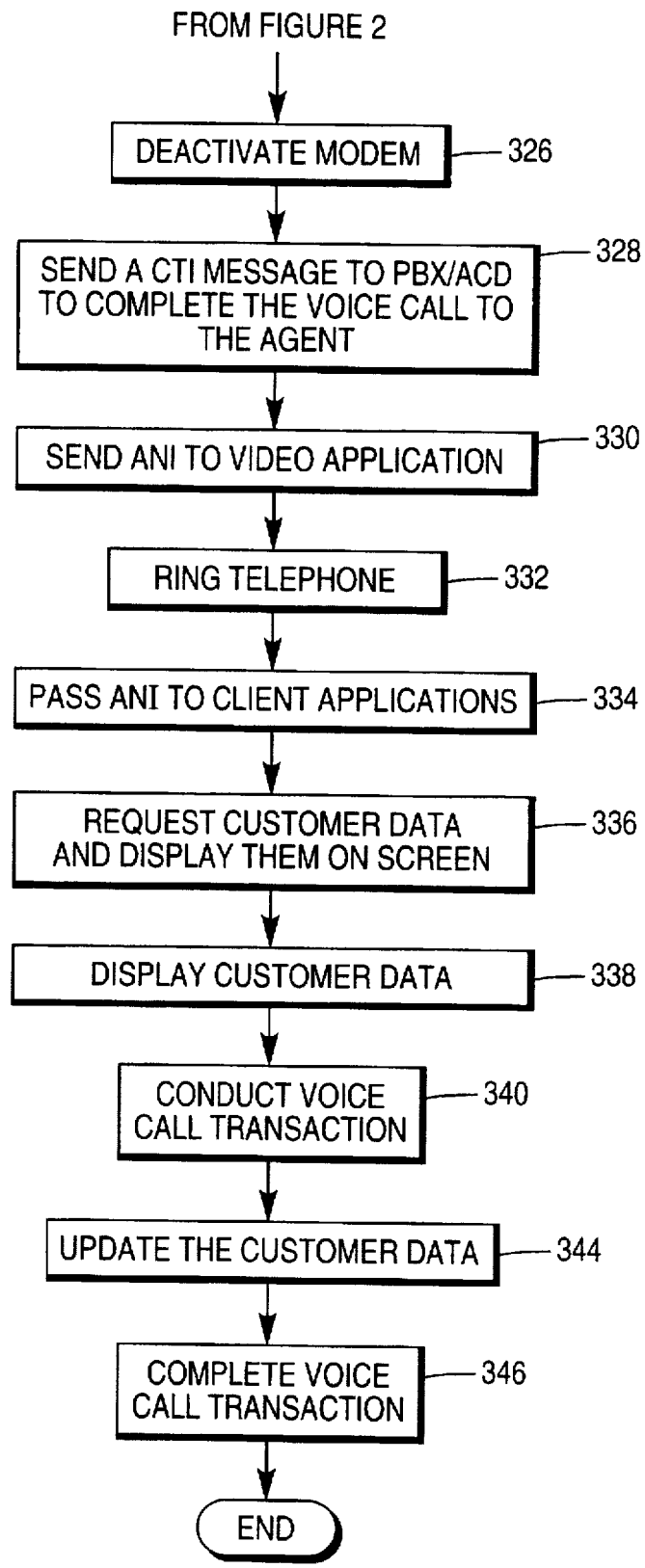
FIG. 3 depicts a flowchart showing a portion of the process for routing a voice call to an agent workstation in the call center, in accordance to the present invention.

FIG. 3 depicts a flowchart showing a portion of the process for routing a voice call to an agent workstation, in accordance with the present invention.

As discussed above, if step 225 in FIG. 2 detects that the inbound call is a voice call, the operation is directed to step 326 in FIG. 3.

In step 326, because the video_flag is in inactive state, video application 156 deactivates modem 152 so that the modem will not answer the inbound voice call. Also, video application 156 sends acknowledgment to CTI interface server 142 (via client interface application 160), indicating that the identified agent is ready to take the inbound voice call.

In step 328, upon receiving the acknowledgment from video application 156, CTI interface server 142 sends a CTI message to PBX/ACD 108, so that the PBX/ACD can route the voice call to the identified agent workstation (agent workstation 120 in this example).

In step 330, CTI interface server 142 sends the ANI to video application 156.

In step 332, since modem 152 has been deactivated, the inbound voice call from PBX/ACD 108 rings telephone set 118 to notify the agent, who is operating the telephone set, that a voice call is coming.

In step 334, video application 156 passes the ANI to client applications 158. Among client applications 158, a customer specific voice transaction application is invoked.

In step 336, the customer specific voice transaction application requests the customer data based on the ANI via client interface application 160. The data relating to the calling customer can be generated from database 138 and presented to the agent via presentation layer 150.

In step 338, the customer specific voice transaction application displays the customer data on display device 117 in agent workstation 120.

In step 340, the voice call transaction is conducted between the caller and the agent.

In step 344, the customer data newly collected can be saved to update the caller's data record.

In step 346, the voice call transaction is completed.

It should be noted that present invention uses a modem call to initiate and prepare a video call. This is advantageous because most existing PBXs/ACDs can handle only a single call to an agent, while H.320 standard (video standard) requires multiple BRI channels to achieve the video performance that is needed. By using a modem call to initiate and prepare a video call, the present invention does not require a PBX/ACD to associate multiple BRI channels together when routing a video call to an agent. Thus, existing PBXs/ACDs can be used to implement the present invention without undue modification.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. An apparatus for routing inbound calls from one or more end-point terminals to a single group of agents in a service group, the inbound calls being either video calls or voice calls, the agents capable of receiving and processing the voice calls and the video calls, comprising:

an interface server capable of receiving voice calls and video calls, the interface server forwarding a received voice call with a video flag in an inactive state and a received video call with the video flag in an active state; and at least one agent workstation including an interface for checking the state of the video flag to establish either a data session with an agent for the video call or a voice call with the agent.

2. The apparatus of claim 1, wherein the agent workstation comprises a presentation layer that permits the agent to interact with either video calls or voice calls.

3. The apparatus of claim 1, wherein each of the at least agent workstation includes a video/ISDN board and a modem.

4. The apparatus of claim 1, wherein the interface server includes a data collection server, a CTI server, and a database.

5. The apparatus of claim 1, further comprising a PBX/ACD.

6. The apparatus of claim 5, wherein the PBX/ACD, interface server and the at least one agent workstation are connected via a CTI link.

7. The apparatus of claim 1, wherein the video calls originate from a KIOSK.

8. The apparatus of claim 1, wherein the inbound calls include at least one of an ANI and a DNIS.

9. A method of routing inbound calls from one or more end-point terminals to a single group of agents in a service group, the inbound calls being either video calls or voice calls, the agents being capable of receiving and processing the video calls and the voice calls, comprising:

detecting whether the inbound call is a video call or a voice call; and routing the detected inbound call to one of the agents in the single group of agents with a received video call having a video flag in an inactive state and a received voice call having the video flag in an active state.

10. The method of claim 9, comprising receiving the inbound call at a PBX/ACD via a telephone network.

11. The method of claim 10, comprising notifying a CTI server by the PBX/ACD that an inbound call has been received and passing ANI and DNIS information to the CTI server.

12. The method of claim 11, comprising creating a data record of the received call.

13. The method of claim 11, comprising determining whether the received inbound call based on at least one of the ANI and the DNIS information.

14. The method of claim 13, comprising providing routing data including at least one of a routing number and an ISDN number.

15. The method of claim 9, wherein said routing step includes selecting one of the agents.

16. The method of claim 9, comprising setting a modem to answer the video call if the video flag is in the active state.

17. The method of claim 9, comprising deactivating a modem if the video flag is in the inactive state.

18. The method of claim 16, comprising establishing a modem link and forwarding control data from the end-point terminal to an agent workstation.

19. The method of claim 18, wherein the control data includes customer identification, application identification and video KIOSK information.

20. The method of claim 19, comprising checking the security status of an end-point terminal using the control data.

21. The method of claim 18, comprising accessing a database and providing customer information to the agent base on the control data.

22. The method of claim 16, comprising activating two BRI channels between the end-point terminal and an agent workstation.

23. The method of claim 16, wherein the modem uses an H.320 standard communication protocol.

24. The method of claim 17, comprising ringing a handset to notify the agent.

* * * * *